United States Patent Office.

NEWTON B. HALL AND HERBERT JONES, OF BRANFORD, CONNECTICUT, ASSIGNORS TO THOMAS KENNEDY, OF SAME PLACE.

*Letters Patent No. 78,592, dated June 2, 1868.*

---

IMPROVED CEMENT FOR FASTENING DOOR-KNOBS, AND FOR OTHER PURPOSES.

---

*The Schedule referred to in these Letters Patent and making part of the same.*

---

TO ALL WHOM IT MAY CONCERN:

Be it known that we, NEWTON B. HALL and HERBERT JONES, of Branford, in the county of New Haven, and State of Connecticut, have invented a new Improved Cement; and we do hereby declare the following to be a full, clear, and exact description of the same.

This invention relates to an improvement in cement, the object being to produce a cement peculiarly adapted for securing mineral or porcelain door-knobs to their metallic necks.

Various devices have been resorted to to accomplish this object in a perfect manner, but as yet no cement has been produced which would stand the extreme test to which door-knobs are subjected. The cement requires to be both hard and tough, as distinguished from a hard and brittle cement.

Many cements have been produced which possess in the fullest degree the last two qualities, but none which possess the toughness produced by the composition hereafter described; and the invention, whereby this object is accomplished, consists in the combination, with alum and sand, of a certain portion of sulphate of zinc, combined with and boiled down in water.

To enable others to prepare our cement, we will fully describe our manner of so doing.

We mix in the proportion of eight ounces alum, eight ounces sand, and four ounces sulphate of zinc; pulverize and thoroughly mix; then add one quart of water, and boil over a slow fire for about two hours, or until the composition attains the consistency of honey; then, while still hot, fill the knobs around the neck, in the usual manner for other cements, and so soon as cold the cement is hard and strong, and possessing the desirable quality of toughness. This toughness is owing to the sulphate of zinc.

Alum and sand have been combined with other materials, as copperas, &c., but such combinations only add to the brittleness of the cement. No other material, of which we are aware, will give to the cement the important quality of toughness as is given by the zinc.

This combination, though specially adapted for the purpose which we have described, is alike applicable for other uses.

Having thus fully described our invention, what we claim as new and useful, and desire to secure by Letters Patent, is—

The cement, produced by the combination of materials, and in the proportions herein fully set forth and described.

N. B. HALL,
HERBERT JONES.

Witnesses:
   J. R. WASSON,
   E. F. JONES.